US010994472B2

United States Patent
Lewicki

(10) Patent No.: US 10,994,472 B2
(45) Date of Patent: May 4, 2021

(54) HIGH PERFORMANCE, RAPID THERMAL/UV CURING EPOXY RESIN FOR ADDITIVE MANUFACTURING OF SHORT AND CONTINUOUS CARBON FIBER EPOXY COMPOSITES

(71) Applicant: LAWRENCE LIVERMORE NATIONAL SECURITY, LLC, Livermore, CA (US)

(72) Inventor: James Lewicki, Oakland, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 15/948,071

(22) Filed: Apr. 9, 2018

(65) Prior Publication Data

US 2018/0243988 A1  Aug. 30, 2018

Related U.S. Application Data

(63) Continuation-in-part of application No. 14/802,029, filed on Jul. 17, 2015, now Pat. No. 9,944,016.

(51) Int. Cl.
*B29C 64/106* (2017.01)
*B29C 64/255* (2017.01)
(Continued)

(52) U.S. Cl.
CPC .......... *B29C 64/106* (2017.08); *B29C 64/209* (2017.08); *B29C 64/227* (2017.08);
(Continued)

(58) Field of Classification Search
None
See application file for complete search history.

(56) References Cited

U.S. PATENT DOCUMENTS 5,031,120 A * 7/1991 Pomerantz ............ B29C 64/135
425/174
5,120,476 A * 6/1992 Scholz ................ B29C 67/0066
156/273.5
(Continued)

FOREIGN PATENT DOCUMENTS

WO      2015-017421 A2   2/2015
WO      WO2016191329     12/2016

OTHER PUBLICATIONS

International Search Report and Written Opinion for PCT/US2019/026394, corresponding to U.S. Appl. No. 15/948,071, 7 pages.

*Primary Examiner* — Joseph S Del Sole
*Assistant Examiner* — Manley L Cummins, IV
(74) *Attorney, Agent, or Firm* — Eddie E. Scott

(57) ABSTRACT

An additive manufacturing resin system includes a container; a build platform in the container; a build platform drive; an additive manufacturing resin that forms an additive manufacturing resin bath; an additive manufacturing print head; a build material supply connected to the additive manufacturing print head; an infill resin in the container, wherein the infill resin is supported by the additive manufacturing resin bath; a computer controller; and an extruded material that forms the product, wherein the infill resin at least partially surrounds the extruded material that forms the product. An infill resin supply provides the infill resin into the container and a control valve is connected to the infill resin supply. An IR light sensor is connected to the control valve and operatively connected to the infill resin in the container.

2 Claims, 5 Drawing Sheets

(51) Int. Cl.

| | | |
|---|---|---|
| *B29C 64/245* | (2017.01) | |
| *B29C 64/307* | (2017.01) | |
| *B29C 64/393* | (2017.01) | |
| *B29C 64/227* | (2017.01) | |
| *B33Y 40/00* | (2020.01) | |
| *B33Y 50/02* | (2015.01) | |
| *B33Y 30/00* | (2015.01) | |
| *B29C 64/321* | (2017.01) | |
| *B29C 64/209* | (2017.01) | |
| B29K 75/00 | (2006.01) | |
| B29K 33/00 | (2006.01) | |
| B29K 63/00 | (2006.01) | |

(52) U.S. Cl.
CPC .......... *B29C 64/245* (2017.08); *B29C 64/255* (2017.08); *B29C 64/307* (2017.08); *B29C 64/321* (2017.08); *B29C 64/393* (2017.08); *B33Y 30/00* (2014.12); *B33Y 40/00* (2014.12); *B33Y 50/02* (2014.12); *B29K 2033/08* (2013.01); *B29K 2063/00* (2013.01); *B29K 2075/00* (2013.01)

(56) References Cited

U.S. PATENT DOCUMENTS

| | | | |
|---|---|---|---|
| 5,121,329 A | 6/1992 | Crump | |
| 5,303,141 A | 4/1994 | Batchelder et al. | |
| 5,506,607 A * | 4/1996 | Sanders, Jr. | B41J 2/01 118/695 |
| 5,573,721 A * | 11/1996 | Gillette | B29C 41/12 264/401 |
| 5,594,652 A * | 1/1997 | Penn | H05K 3/125 345/419 |
| 5,906,863 A * | 5/1999 | Lombardi | B29C 41/22 427/385.5 |
| 5,936,861 A | 8/1999 | Jang et al. | |
| 6,076,723 A * | 6/2000 | I-Tsung Pan | B23K 3/0607 228/33 |
| 6,129,872 A | 10/2000 | Jang | |
| 6,299,810 B1 | 10/2001 | Blackinton, Jr. | |
| 7,891,964 B2 | 2/2011 | Skubic et al. | |
| 2002/0041818 A1* | 4/2002 | Abe | B22F 3/1055 419/7 |
| 2002/0113331 A1 | 8/2002 | Zhang et al. | |
| 2002/0195748 A1* | 12/2002 | Farnworth | B33Y 10/00 264/401 |
| 2003/0090034 A1 | 5/2003 | Mulhaupt et al. | |
| 2005/0017393 A1* | 1/2005 | Stockwell | B29B 17/0005 264/113 |
| 2005/0025905 A1* | 2/2005 | Pan | B33Y 10/00 427/558 |
| 2008/0145639 A1 | 6/2008 | Sun et al. | |
| 2013/0328228 A1 | 12/2013 | Pettis et al. | |
| 2014/0061974 A1 | 3/2014 | Tyler | |
| 2014/0232035 A1 | 8/2014 | Bheda | |
| 2014/0291886 A1 | 10/2014 | Mark et al. | |
| 2014/0328964 A1* | 11/2014 | Mark | B29C 70/20 425/166 |
| 2014/0361460 A1 | 12/2014 | Mark | |
| 2016/0129633 A1* | 5/2016 | Huang | B29C 64/20 264/40.7 |
| 2016/0167312 A1* | 6/2016 | Feinberg | A61L 27/24 264/239 |
| 2016/0263822 A1 | 9/2016 | Boyd, IV | |
| 2016/0303779 A1 | 10/2016 | Kunc et al. | |
| 2016/0332881 A1 | 11/2016 | Troester et al. | |

* cited by examiner

HIGH PERFORMANCE, RAPID THERMAL/UV CURING EPOXY RESIN FOR ADDITIVE MANUFACTURING OF SHORT AND CONTINUOUS CARBON FIBER EPOXY COMPOSITES

CROSS-REFERENCE TO RELATED APPLICATIONS

This application is a Continuation-in-Part of U.S. patent application Ser. No. 14/802,029 filed Jul. 17, 2015 titled, "high performance, rapid thermal/UV curing epoxy resin for additive manufacturing of short and continuous carbon fiber epoxy composites," which is incorporated herein by this reference.

STATEMENT AS TO RIGHTS TO APPLICATIONS MADE UNDER FEDERALLY SPONSORED RESEARCH AND DEVELOPMENT

The United States Government has rights in this application pursuant to Contract No. DE-AC52-07NA27344 between the United States Department of Energy and Lawrence Livermore National Security, LLC for the operation of Lawrence Livermore National Laboratory.

BACKGROUND

Field of Endeavor

The present application relates to additive manufacturing and more particularly to high performance, rapid thermal/UV curing epoxy resin for additive manufacturing carbon fiber epoxy composites.

State of Technology

This section provides background information related to the present disclosure which is not necessarily prior art.

U.S. Pat. No. 6,299,810 for a method for manufacturing a carbon fiber composite provides the state of technology information reproduced below.

In a first embodiment of the invention, a series of carbon fibers are fed from a creel to a lathe of a winding assembly. The size or tow of the carbon fibers typically is in the range of 1,000 to 50,000 (i.e. 1,000 to 50,000 individual strands per bundle or tow) and generally between 5 to 20 spools are used to feed fibers of varying sizes to the winding assembly. The winding assembly includes a lathe having an elongated collection trough or basin, and a carriage that is reciprocably movable along the length of the trough. The carbon fibers are fed to the carriage, which includes a wetting jig under which the fibers are passed for applying a resin material to the fibers. The resin material flows through drip openings in the wetting jig and onto the fibers, substantially coating or soaking the fibers with the resin material. The carriage is mounted along a track that extends along the length of the lathe to enable the carriage to be reciprocably movable longitudinally along the length of the lathe. A carriage motor such as a servo motor or similar variable speed reversible motor is mounted at one end of the track to control the movement of the carriage therealong and is linked to a computer control which can be programmed to vary the speed and movement of the carriage along the track, as well as to cause the carriage to pause randomly during its travel along the length of the lathe.

The lathe further includes a main rotary drive motor mounted at the head-stock end of the lathe. The main drive motor typically is a variable speed reversible electric motor, such as a servo motor, and is inked to the same computer control for the carriage motor, which controls the motor so as to operate the drive motor at varying speeds. A mandrel is received within the collection trough, connected to the drive shaft of the drive motor and is rotated by the main rotary drive motor. The mandrel generally is approximately 12 to 20 feet in length and approximately 14 to 65 inches in width, although mandrels of other, varying sizes also can be used as desired. The mandrel generally includes an outer skin or side wall and first and second ends, mounted to the drive shaft and an idler shaft of the lathe, respectively. Heating elements such as heating tapes are generally mounted within the mandrel for internally heating the skin of the mandrel during curing of the resin material. A release agent such as a plastic film, including a nylon or polyethylene film or a non-stick coating such as a water or oil-based spray solvent-based silanes, and organic waxes, or similar agent is applied to the skin of the mandrel, covering the skin and the first and second ends of the mandrel to prevent the resin material from adhering to the mandrel as the carbon fibers are wound thereabout.

As the mandrel is rotated by the lathe, the carbon fibers, with the resin material applied thereto, are wound about the mandrel as the carriage is moved longitudinally along the track in a reciprocal movement to form a weave or sample about the mandrel. Generally, in most conventional processes for forming carbon fiber composites, the speed of the carriage and rotation of the mandrel is rigidly controlled to form the weave or sample with a very precise, exact pattern. In the present invention, however, as the carbon fiber weave or sample is formed, the speed and movement of the carriage is intentionally randomly varied, including pausing or varying the movement of the carriage along the lathe assembly. In addition, other elements of "chaos" such as varying the number of and size of the fibers, varying the amount of resin material applied to the fibers, adding hard and soft pieces or loose fibers onto the mandrel, modifying the outer skin of the mandrel to change to topography of the weave, varying the speed, pitch and tension of the winding of the fibers about the mandrel, and other actions are introduced so as to break up or physically disrupt any pattern to the weave. These physical disruptions or variations during the formation of the weave provide the resultant composite material with a random, or non-uniform, highly unique cross section and a decorative appearance upon finishing.

After a sufficient desired quantity or thickness of the weave has been wound, the mandrel is removed from the lathe assembly and placed within a vacuum chamber. In one preferred embodiment, the vacuum chamber includes an elongated tube, typically formed from steel and having an inner chamber having a sliding tray that is movable along skids or rollers into and out of the vacuum chamber. An upper mold plate is positioned over the tray and is movable toward and away from the tray, into and out of pressurized engagement with the weave or sample, while the tray functions as a lower or bottom mold plate. Thus, as the upper mold plate is moved downwardly, the weave is compressed between the two mold plates. An air bladder or other compression device is mounted within the vacuum chamber and is positioned above and mounted to the upper mold plate. The bladder generally is an inflatable air bladder made from a durable, high strength reinforced silicone rubber material, such as AMS 3320G, manufactured by GE. Upon inflation of the bladder, the upper mold plate is urged downwardly into engagement with the sample so as to apply substantially even pressure along the length of the sample within the tray.

The sample is initially vacuumed to remove any air, voids and resin mixture VOCS, are bubbles or pockets, and is monitored to detect a rise in temperature generally of up to 100.degree. F.-120.degree. F. or as needed depending on resin type, time to cure and various other factors, indicating the resin is starting to cure. Thereafter, the bladder is inflated to apply pressure of approximately 5 to 65 psi to the sample while the vacuum is continued. At the same time, the sample is heated to approximately 200.degree.-220.degree. F. for approximately two hours and until the resin material has cured. The temperature and amount of pressure can further be varied depending on the type of resin used. The application of the vacuum and pressure from the bladder causes the fibers to shift and move, further enhancing the effects of the physical disruptions to the pattern of the sample to cause the sample to be formed with a non-uniform cross-section and topography.

After the carbon fiber weave or sample has been compressed and cured, leaving a substantially solid composite material, the sample is removed from the vacuum chamber, cooled and thereafter is cut off of the mandrel to form elongated planks or sheets of carbon fiber composite. The planks or sheets of carbon fiber composite then are put through a finishing process including planing the composite sheets, cutting the sheets into sections and then sanding and assembling the sections into a variety of products.

United States Published Patent Application No. 2014/0361460 for methods for fiber reinforced additive manufacturing, assigned to MarkForged, Inc., provides the state of technology information reproduced below.

According to a first version of the present invention, one combination of steps for additive manufacturing of a part includes supplying an unmelted void free fiber reinforced composite filament including one or more axial fiber strands extending within a matrix material of the filament, having no substantial air gaps within the matrix material. The unmelted composite filament is fed at a feed rate along a clearance fit zone that prevents buckling of the filament until the filament reaches a buckling section (i.e., at a terminal and of the nozzlet, opposing the part, optionally with a clearance between the nozzlet end and the part of a filament diameter or less) of the nozzlet. The filament is heated to a temperature greater than a melting temperature of the matrix material to melt the matrix material interstitially within the filament, in particular in a transverse pressure zone. An ironing force is applied to the melted matrix material and the one or more axial fiber strands of the fiber reinforced composite filament with an ironing lip as the fiber reinforced composite filament is deposited in bonded ranks to the part. In this case, the ironing lip is translated adjacent to the part at a printing rate that maintains a neutral to positive tension in the fiber reinforced composite filament between the ironing lip and the part, this neutral-to-positive (i.e., from no tension to some tension) tension being less than that necessary to separate a bonded rank from the part.

According to a second version of the present invention, another additional or alternative combination of steps for additive manufacturing of a part includes the above-mentioned supplying step, and feeding the fiber reinforced composite filament at a feed rate. The filament is similarly heated, in particular in a transverse pressure zone. The melted matrix material and the at least one axial fiber strand of the composite filament are threaded (e.g., through a heated print head, and in an unmelted state) to contact the part in a transverse pressure zone. This transverse pressure zone is translated relative to and adjacent to the part at a printing rate to bring an end of the filament (including the fiber and the matrix) to a melting position. The end of the filament may optionally buckle or bend to reach this position. At the melting position, the matrix material is melted interstitially within the filament.

According to a third version of the present invention, a three-dimensional printer for additive manufacturing of a part includes a fiber composite filament supply (e.g., a spool of filament, or a magazine of discrete filament segments) of unmelted void free fiber reinforced composite filament including one or more axial fiber strands extending within a matrix material of the filament, having no substantial air gaps within the matrix material. One or more linear feed mechanisms (e.g., a driven frictional rollers or conveyors, a feeding track, gravity, hydraulic or other pressure, etc., optionally with included slip clutch or one-way bearing to permit speed differential between material feed speed and printing speed) advances unmelted composite filament a feed rate, optionally along a clearance fit channel (e.g., a tube, a conduit, guide a channel within a solid part, conveyor rollers or balls) which guides the filament along a path or trajectory and/or prevents buckling of the filament. A print head may include (all optional and/or alternatives) elements of a heater and/or hot zone and/or hot cavity, one or more filament guides, a cold feed zone and/or cooler, and/or a reshaping lip, pressing tip, ironing tip, and/or ironing plate, and/or linear and/or rotational actuators to move the print head in any of X, Y, Z, directions and/or additionally in one to three rotational degrees of freedom. A build platen may include a build surface and may include one or more linear actuators to move the build platen in any of X, Y, Z, directions and/or additionally in one to three rotational degrees of freedom. The heater (e.g., a radiant heater, an inductive heater, a hot air jet or fluid jet, a resistance heater, application of beamed or radiant electromagnetic radiation, optionally heating the ironing tip) heats the filament, and in particular the matrix material, to a temperature greater than a melting temperature of the matrix material (to melt the matrix material around a single fiber, or in the case of multiple strands, interstitially among the strands within the filament). The linear actuators and/or rotational actuators of the print head and/or build platen may each solely and/or in cooperation define a printing rate, which is the velocity at which a bonded rank is formed. A controller optionally monitors the temperature of the heater, of the filament, and/or and energy consumed by the heater via sensors.

SUMMARY

Features and advantages of the disclosed apparatus, systems, and methods will become apparent from the following description. Applicant is providing this description, which includes drawings and examples of specific embodiments, to give a broad representation of the apparatus, systems, and methods. Various changes and modifications within the spirit and scope of the application will become apparent to those skilled in the art from this description and by practice of the apparatus, systems, and methods. The scope of the apparatus, systems, and methods is not intended to be limited to the particular forms disclosed and the application covers all modifications, equivalents, and alternatives falling within the spirit and scope of the apparatus, systems, and methods as defined by the claims.

High performance carbon fiber/thermoset resin (CF/thermoset) composites are a potentially transformative materials solution for a range of applications including aerospace and defense as they can have mechanical properties approaching that of steel at a fraction of the density. However, the development and application of these materials is limited by the process by which they are manufactured. High performance CF/thermoset composites (typically based on aromatic epoxy resins) are produced via a labor intensive winding and hand layup process which is both costly and severely limits the control over the final component micro-meso structure and hence the performance, reliability and repeatability of the parts and process. Additive manufacture and 3D printing technologies offer the potential to both fully automate the production of CF composites and allow new degrees of freedom and control over the fiber placement orientation and microstructure—leading to vast improvements in performance, reliability scalability and reductions in cost. There is currently no commercial means of additively manufacturing continuous or short carbon fiber epoxy composites through direct ink writing (DIW) or any other AM process. This is primarily a result of the limitations of current epoxy resins systems employed in these processes (amine cured 2 component epoxies) which require time periods of hours-days to achieve a full cure. This precludes their use in any form of continuous laydown process where the resin component plays an immediate active role in mechanically orienting and constraining the fiber(s) direction and alignment. In the specific case of chopped or discrete CF/epoxy & potential continuous fiber DIW fiber composite deposition using direct ink wiring or other novel means, this limitation of current epoxy resin systems precludes the use of DIW or any other method of constructing a self-supporting shape of any complexity that can mechanically constrain the fibers on a reasonable manufacturing timeframe (minutes/seconds).

The inventor has developed apparatus, systems, and methods for additive manufacturing including a resin system that has final mechanical properties which meet or exceed current commercial amine cured epoxy resins yet has curing characteristics and a rheological profile to allow the printing of complex 3D structures with controlled fiber alignments. The additive manufacturing resin system includes a container; a build platform in the container; a build platform drive; an additive manufacturing resin that forms an additive manufacturing resin bath; an additive manufacturing print head; a build material supply connected to the additive manufacturing print head; an infill resin in the container, wherein the infill resin is supported by the additive manufacturing resin bath; a computer controller; and an extruded material that forms the product, wherein the infill resin at least partially surrounds the extruded material that forms the product. An infill resin supply provides the infill resin into the container and a control valve is connected to the infill resin supply. An IR light sensor is connected to the control valve and operatively connected to the infill resin in the container. The resin system has a tailored resin that has a resin mass wherein the tailored resin includes an epoxy component, a filler component, a catalyst component, and a chain extender component; wherein the epoxy component is 70-95% of the resin mass, wherein the filler component is 1-20% of the resin mass, wherein the catalyst component is 0.1-10% of the resin mass, and wherein the chain extender component is 0-50% of the resin mass.

The apparatus, systems, and methods are susceptible to modifications and alternative forms. Specific embodiments are shown by way of example. It is to be understood that the apparatus, systems, and methods are not limited to the particular forms disclosed. The apparatus, systems, and methods cover all modifications, equivalents, and alternatives falling within the spirit and scope of the application as defined by the claims.

BRIEF DESCRIPTION OF THE DRAWINGS

The accompanying drawings, which are incorporated into and constitute a part of the specification, illustrate specific embodiments of the apparatus, systems, and methods and, together with the general description given above, and the detailed description of the specific embodiments, serve to explain the principles of the apparatus, systems, and methods.

DETAILED DESCRIPTION OF SPECIFIC EMBODIMENTS

Figure 1:
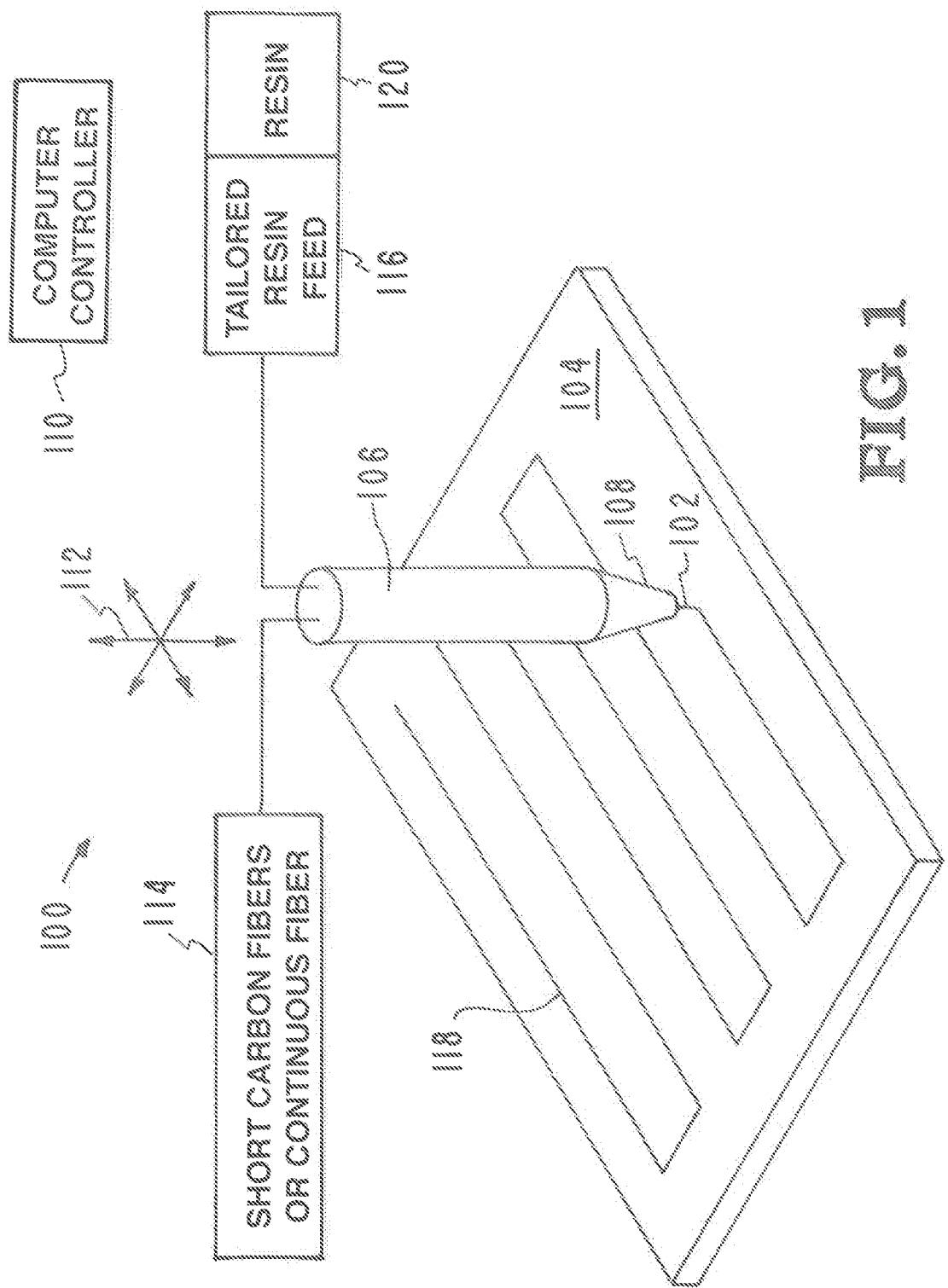
FIG. 1 illustrates an apparatus, systems, and methods for 3D printing and otherwise additively manufacturing processes used to make a three-dimensional object.

Referring to the drawings, to the following detailed description, and to incorporated materials, detailed information about the apparatus, systems, and methods is provided including the description of specific embodiments. The detailed description serves to explain the principles of the apparatus, systems, and methods. The apparatus, systems, and methods are susceptible to modifications and alternative forms. The application is not limited to the particular forms disclosed. The application covers all modifications, equivalents, and alternatives falling within the spirit and scope of the apparatus, systems, and methods as defined by the claims.

High performance Carbon Fiber/Epoxy (CF/Epoxy) composites are a potentially transformative materials solution for a range of applications including aerospace and defense because they can have mechanical properties approaching that of steel at a fraction of the density. However, the development and application of these materials is limited by the process by which they are manufactured. High performance CF/Epoxy composites are produced via a labor intensive winding and hand layup process which is both costly and severely limits the control over the final component micro-meso structure and hence the performance, reliability and repeatability of the parts and process. Additive manufacture and 3D printing technologies offer the potential to both fully automate the production of CF composites and allow new degrees of freedom and control over the fiber placement orientation and microstructure—leading to vast improvements in performance, reliability scalability and reductions in cost. There is currently no commercial means of additively manufacturing continuous or short carbon fiber epoxy composites through direct ink writing (DIW) or any other AM process. This is primarily a result of the limitations of current epoxy resins systems employed in these processes (amine cured component epoxies) which require time periods of hours-days to achieve a full cure. This precludes their use in any form of continuous laydown process where the resin component plays an immediate active role in mechanically orienting and constraining the fiber(s) direction and alignment. In the specific case of chopped or discrete CF/epoxy & potential continuous fiber DIW fiber composite deposition using direct ink wiring or other novel means, this limitation of current epoxy resin systems precludes the use of DIW or any other method of constructing a self-supporting shape of any complexity that can mechanically constrain the fibers on a reasonable manufacturing timeframe (minutes/seconds).

The terms "short carbon fiber," "chopped carbon fiber," and "short/chopped carbon fiber" as used in this application have the meanings defined below.

Short Carbon Fiber: A fiber of nearly pure carbon in the range of 1 micron to 100 millimeters in length.

Chopped Carbon Fiber: A short carbon fiber that has been prepared by chopping.

Short/Chopped Carbon Fiber: A short carbon fiber that has chopped.

Referring now to the drawings and in particular to FIG. 1, an embodiment of the inventor's apparatus, systems, and methods is shown. The embodiment is designated generally by the reference numeral 100. The embodiment 100 provides apparatus, systems, and methods for 3D printing and otherwise additively manufacturing processes used to make a three-dimensional object. Additive processes are used wherein successive layers of material are laid down under computer control. The three-dimensional objects can be of almost any shape or geometry and can be produced from a model or other electronic data source.

As illustrated in FIG. 1, extruded material 102 composed of short carbon fibers or a continuous fiber in a thermoset polymer matrix are deposited on a surface 104 to be printed by print head 106. The print head 106 has a nozzle 108 for extruding the short carbon fibers or a continuous fiber onto the surface 104. Movement of the print head 106 is controlled by computer controller 110 which provides freedom of movement along all axes as indicated by the arrows 112. The product to be created by the system 100 is fed to the computer controller 110 with the widely used numerical control programming language G-Code. The computer controller 110 uses the instructions to move the print head 106 through a series of moments along the surface 104 forming the product to be created by the system 100.

The print head 106 receives the short carbon fibers or continuous fiber 114 that is moved through the print head and emerges as the extruded material 102. A tailored resin feed system 116 is connected to the print head 106. The tailored resin feed 116 and the short carbon fibers or continuous fiber 114 are combined to produce the extruded material 102. Movement the print head 106 on the surface 104 forms a pattern 118 providing the product to be created by the system 100.

The resin 120 in the tailored resin feed 116 is an epoxy-based resin that has a unique cure (polymerization) behavior and rheological profile which allows it to be used as the resin component of the inventor's continuous additive manufacturing process based on direct Ink Write technology. The resin 120 has the ability for the epoxy "ink" to be polymerized to a thermoset network at moderate temperatures and/or UV irradiation fluxes, over timescales which allow it to be processed in a continuous carbon fiber writing process.

Tailored Resin

The inventor's high performance thermoset epoxy resin has final mechanical properties which meet or exceed current commercial amine cured epoxy resins, yet has curing characteristics (gelation in 1-5 seconds, full density cure in 10 minutes) and a rheological profile (shear thinning, and viscosity matched with the CF phase) to allow the printing of complex 3D structures with controlled fiber alignments.

The inventor's high performance thermoset epoxy resin based on four or more variable components to make an epoxy resin system that has the rheological and curing properties required for real-time DIW processing of a CF/Epoxy composite that will both lay down at high resolution (200 um thread-size minimum) can cure in less than 5 minutes, allowing the formation of complex 3D structures. Furthermore, the final epoxy resin component will have mechanical properties on a par or in excess of current commercial amine cured thermoset resin systems.

Component 1: an Aromatic epoxy molecule based on a Bis-phenyl F diglycidyl ether core that may be chemical modified with other chemical functionality or partially polymerized to form a higher viscosity oligomer with formaldehyde or some other reactive chain extender molecule. The epoxy component shall comprise 70-95 Wt % of the total unfiled resin mass.

Component 2: an inorganic filler for rheological tailoring based on silica, an aluminosilicate or any other stable inorganic oxide having a high surface to volume ratio and a primary particle size In the range of 20-100 nm. The filler shall comprise 1-20 Wt % of the total resin mass and may be surface modified with a range of chemical functionalities including but not limited to epoxy groups, amines, hydroxyls, alkyls and aromatics.

Component 3: A catalyst system based on a thermal 'latent cure' system Specifically Ytterbium triflate or a similar rare earth Lewis acid, such as but not limited to Lanthanum(III) trifluoromethanesulfonate and/or an efficient photo-acid initiator such as, but not limited to Triarylsulfonium hexafluorophosphate salts. The catalyst component shall comprise between 0.1 and 10 wt % of the total resin mass.

Component 4: a chain extender molecule/secondary crosslinking moiety based on an oligomeric polyether, polysiloxane or polyolefin bis- to multi functionalized with epoxy, hydroxyl or amine groups. The extender/crosslinker shall comprise between 0-50 Wt % of the total resin formulation mass.

The inventor's high performance thermoset epoxy resin functions through various combinations of components 1-4 over the proportion ranges stated, a range of resin systems may be formulated which have the following tunable properties:

A cure time in the range of 1 second to 7 days at a maximum of 200 deg. C for rapid cure times and 30° C. for long cure times. The controlled variability in cure is achieved through a combination of component 3.

High Ytterbium triflate loadings may achieve fast cure times at moderate temperatures (150 C) and may be further accelerated by the presence of a UV curing agent. Non-hybrid (fully thermal or UV cure systems) also yield favorable cure times in the order of minutes. Long 'pot-life' of resin formulations are achieved through the stability of the formulation at room temperature and ambient light, as the latent cure catalyst only displays significant activity above 80° C. and cationic (photo-acid generating) UV initiators may be selected to be insensitive above mid UV-B wavelengths.

Figure 2:
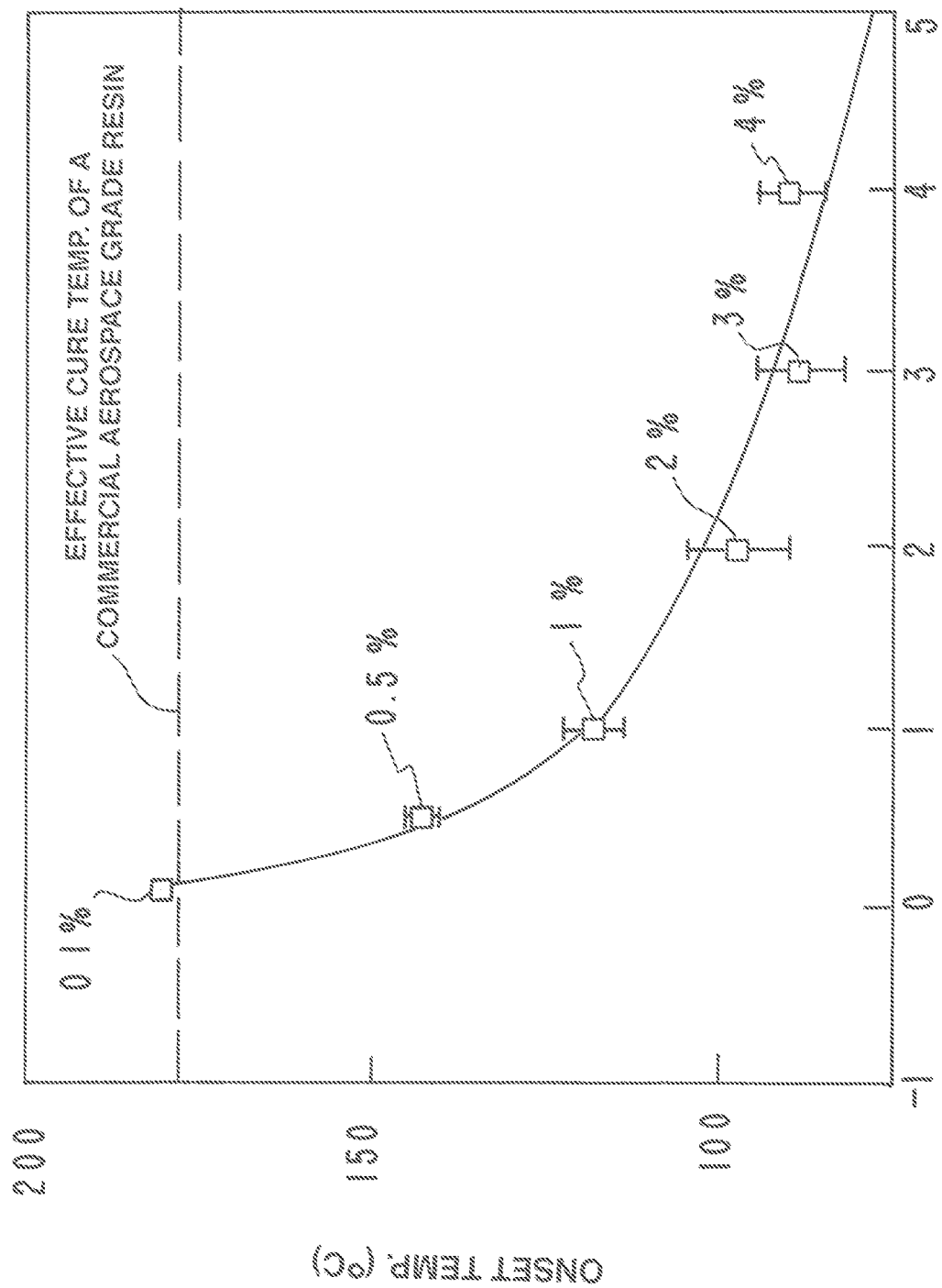
FIG. 2 is a graph that illustrates the sensitivity of the inventor's high performance thermoset epoxy resin system to both thermal environments and the concentration of the latent curing agent.

Referring now to FIG. 2, an example of the sensitivity of the inventor's high performance thermoset epoxy resin system to both thermal environments and the concentration of the latent curing agent is illustrated.

Rheological properties suitable for DIW and fiber matching. The use of component 1 in varying proportions allows the assembled formulation to be tailored to be thixotropic at low shear rates and have a range of rheological profiles such as plug flow, shear thinning and a degree of rapid thixotropic recovery. This is achieved though the inorganic filler particle-particle and particle-polymer interactions. Component 2 also allows the low shear and static viscosity to be increased so that the resin will not flow past and separate from the final CF component as part of the assembled printing system.

Final resin mechanical properties on a par or in excess of current commercial resin systems. This is a consequence of all four components. Component 1 imparts base high performance mechanical properties when cured to completion by component 3. the elastic modulus, elongation at break and compressive strength of the resin may be further tuned and altered to application though the inclusion of component 2 and by varying contributions from component 4. For example, inclusion of a bis functional epoxy siloxane molecule will increase elongation at break and the inclusion of a hexafunctional, rigid aromatic hydroxyl secondary crosslinker may increase the elastic modulus of the resin.

In practice, a tailored formulation may be combined with either a discrete carbon fiber or impregnated into a continuous fiber tow or single fiber system. The use of Heat, UV or a combination of both will cure the resin and the fiber component as it is laid down by the DIW print head.

Example 1

Figure 3:
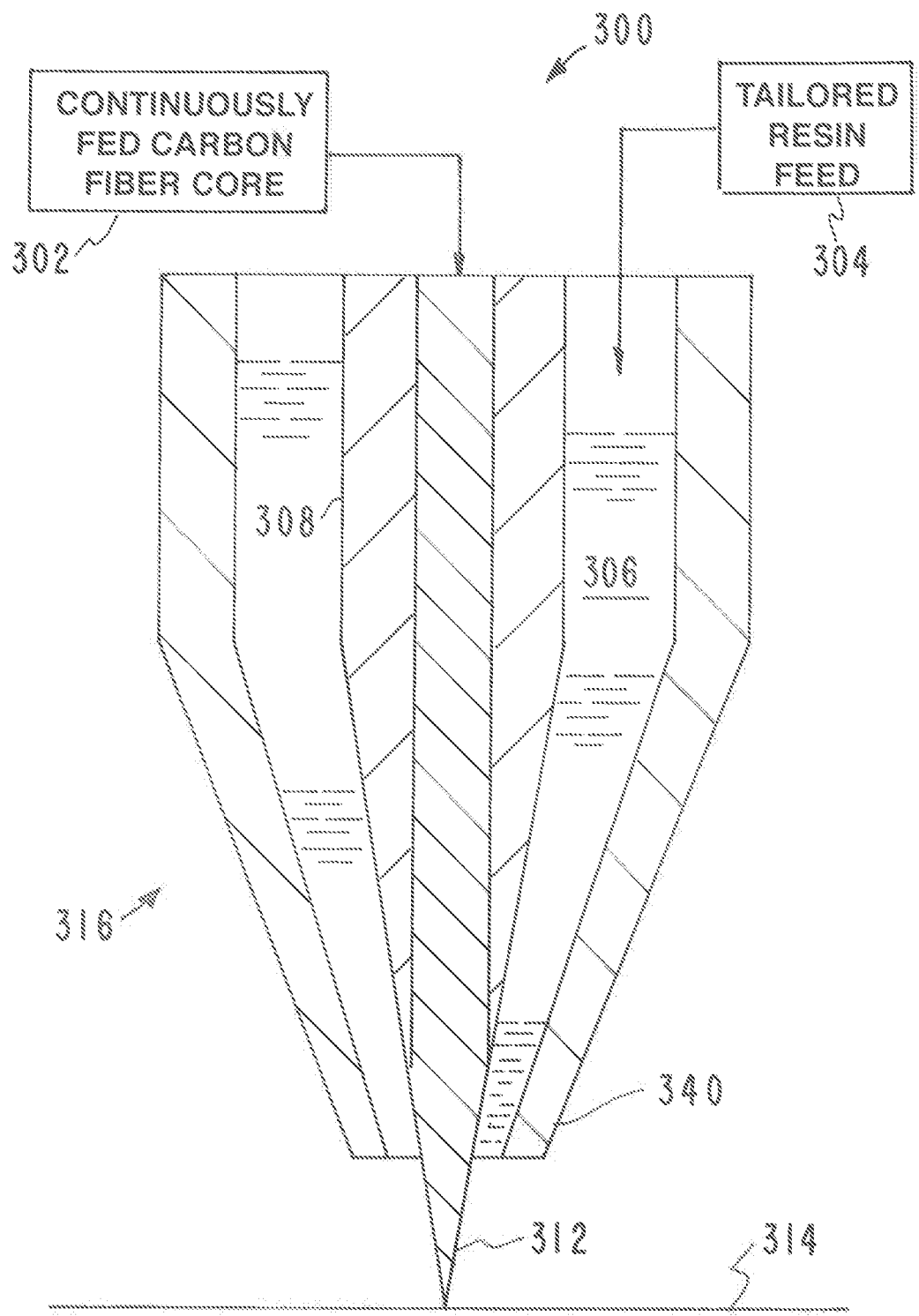
FIG. 3 illustrates one example of the inventor's tailored resin system for 3D printing and otherwise additively manufacturing processes used to make a three-dimensional object.

Referring now to FIG. 3, an example of one embodiment of the inventor's apparatus, systems, and methods is illustrated. The embodiment is designated generally by the reference numeral 300. The embodiment 300 provides apparatus, systems, and methods for additive manufacturing including a resin system that has final mechanical properties which meet or exceed current commercial amine cured epoxy resins yet has curing characteristics and a rheological profile to allow the printing of complex 3D structures with controlled fiber alignments.

FIG. 3 shows the print head nozzle 316 that extrudes a continuous fiber material 312 onto a substrate 314. A continuously fed carbon fiber core 302 is fed into the print head nozzle 316. A fiber core shaper 308 in the print head nozzle 316 shapes the continuously fed carbon fiber core 302 within the nozzle 316. A resin chamber 306 in the print head nozzle 316 directs the resin 304 onto the shaped continuously fed carbon fiber core 302 within the nozzle 316.

A tapered section 310 of the nozzle 316 forces the resin 304 into the fiber 302. The system 300 functions by pulling the fiber 302 tow from a feed system, through the nozzle 316 as at the stage moves the system in 3 dimensions. An initial anchor point is made on the surface 314 and subsequent movements of system pull out further fiber 302 which is rapidly 'fixed' in position by curing. The inventor's apparatus, systems, and methods 100 has the ability to print and cure a continuous tow of epoxy impregnated fiber into complex 3D structures that have an unprecedented degree of control over the placement and orientation of the fibers within the matrix.

The resin system 300 has a tailored resin 304 that has a resin mass wherein the tailored resin includes an epoxy component, a filler component, a catalyst component, and a chain extender component. The epoxy component is 70-95% of the resin mass, the filler component is 1-20% of the resin mass, the catalyst component is 0.1-10% of the resin mass, and the chain extender component is 0-50% of the resin mass. The resin four or more variable components provides an epoxy resin system that has the rheological and curing properties required for real-time DIW processing of a CF/Epoxy composite that will both lay down at high resolution (200 um thread-size minimum) can cure in less than 5 minutes, allowing the formation of complex 3D structures. Furthermore, the final epoxy resin component will have mechanical properties on a par or in excess of current commercial amine cured thermoset resin systems. The components are further described below.

Epoxy Component: an Aromatic epoxy molecule based on a Bis-phenyl F diglycidyl ether core that may be chemical modified with other chemical functionality or partially polymerized to form a higher viscosity oligomer with formaldehyde or an alternative reactive diamer. The epoxy component shall comprise 70-95 Wt % of the total unfiled resin mass.

Filler Component: an inorganic filler for rheological tailoring based on silica, an aluminosilicate or any other stable inorganic oxide having a high surface to volume ratio and a primary particle size in the range of 20-100 nm. The filler shall comprise 1-20 Wt % of the total resin mass and may be surface modified with a range of chemical functionalities including but not limited to epoxy groups, amines, hydroxyls, alkyls and aromatics.

Catalyst Component: A catalyst system based on a thermal 'latent cure' system Specifically Ytterbium triflate or a similar rare earth Lewis acid, such as but not limited to Lanthanum(III) trifluoromethanesulfonate and/or an efficient photo-acid initiator such as, but not limited to Triarylsulfonium hexafluorophosphate salts. The catalyst component shall comprise between 0.1 and 10 wt % of the total resin mass.

Chain Extender Component: a chain extender molecule/secondary crosslinking moiety based on an oligomeric polyether, polysiloxane or polyolefin bis- to multi functionalized with epoxy, hydroxyl or amine groups. The extender/crosslinker shall comprise between 0-50 Wt % of the total resin formulation mass.

Example 2

Figure 4:
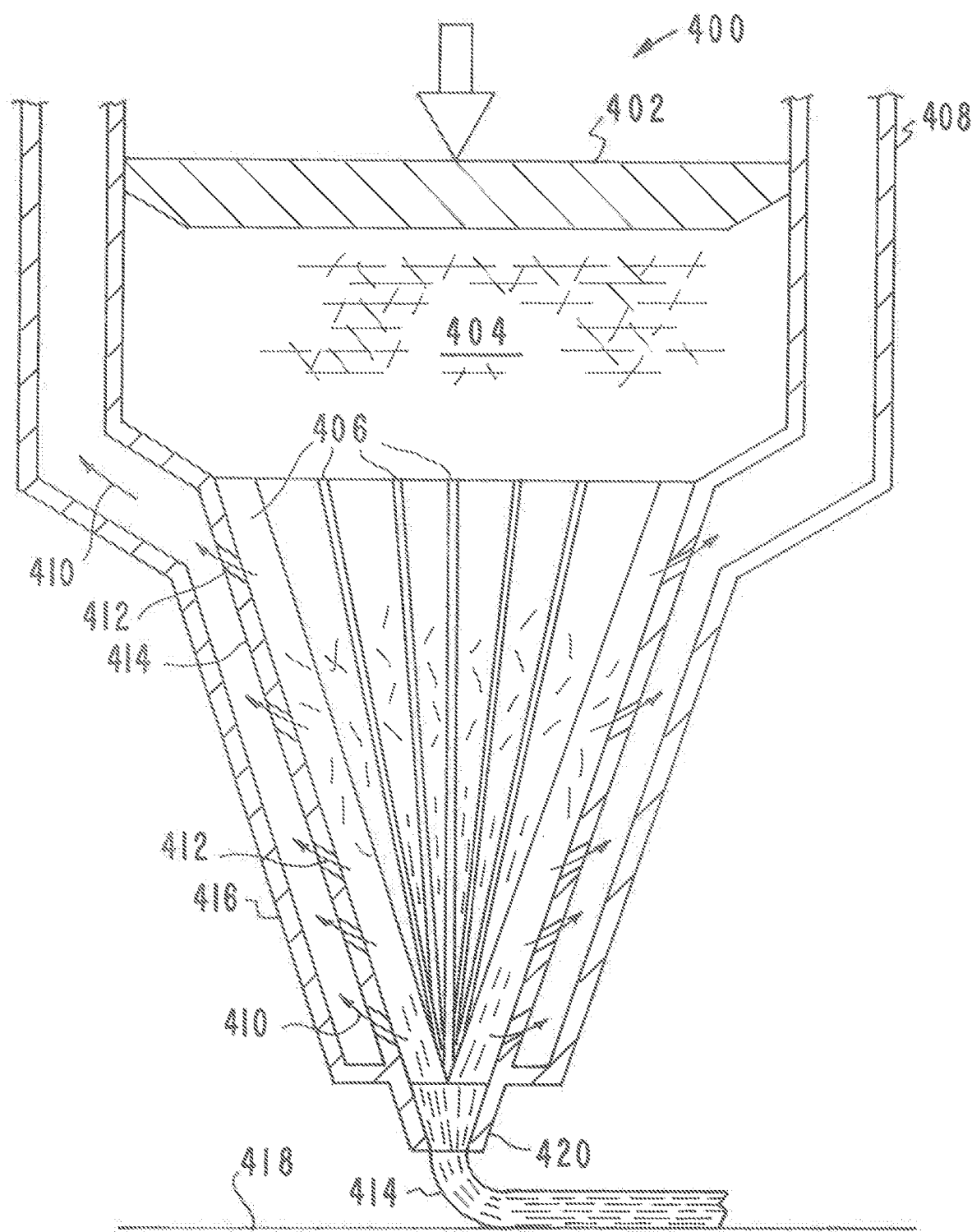
FIG. 4 illustrates another example of the inventor's tailored resin system for 3D printing and otherwise additively manufacturing processes used to make a three-dimensional object.

Referring now to FIG. 4, another example of an embodiment of the inventor's apparatus, systems, and methods is illustrated. The embodiment is designated generally by the reference numeral 400. The embodiment 400 provides apparatus, systems, and methods for additive manufacturing including a resin system that has final mechanical properties which meet or exceed current commercial amine cured epoxy resins yet has curing characteristics and a rheological profile to allow the printing of complex 3D structures with controlled fiber alignments.

FIG. 4 is a cut away view of the print head showing short carbon fibers extruded in a thermoset polymer matrix. The print head nozzle 408 is shown extruding 412 the material 114 onto the substrate 418.

An upper reservoir in the print head 408 holds prepared (randomly aligned) short fibers dispersed in the resin. The randomly aligned short fibers dispersed in resin are designated by the reference numeral 404. A movable ram 402 is pressure actuated to drive the ink 404 into the nozzle 408 during printing. The print head 408 has a primary tapered nozzle section 414 which has a "taper in" over the range of 1-45 degrees symmetrical and a variable length. Internal baffles 406 in primary tapered nozzle section 414 provide wall alignment of the short fibers 404. Angled resin sweat holes 412 of a size 5-100 urn angled against the direction of the taper and in increasing numbers as the nozzle 408 reaches the tip 412 allowing progressive separation of the resin carrier from the fiber. The nozzle tip 420 can be of variable sizes and shapes. A Secondary outer sheathe 416 allows collection of separated resin 410. The construction of the nozzle 408 can be of stainless steel or some suitable alloy, coated internally with a low surface energy, non-reactive polymer layer such as PTFE.

The resin system 400 has a tailored resin 404 that has a resin mass wherein the tailored resin includes an epoxy component, a filler component, a catalyst component, and a chain extender component. The epoxy component is 70-95% of the resin mass, the filler component is 1-20% of the resin mass, the catalyst component is 0.1-10% of the resin mass, and the chain extender component is 0-50% of the resin mass. The resin four or more variable components provides an epoxy resin system that has the rheological and curing properties required for real-time DIW processing of a CF/Epoxy composite that will both lay down at high resolution (200 um thread-size minimum) can cure in less than 5 minutes, allowing the formation of complex 3D structures. Furthermore, the final epoxy resin component will have mechanical properties on a par or in excess of current commercial amine cured thermoset resin systems. The components are further described below.

Epoxy Component: an Aromatic epoxy molecule based on a Bis-phenyl F diglycidyl ether core that may be chemical modified with other chemical functionality or partially polymerized to form a higher viscosity oligomer with form-aldehyde. The epoxy component shall comprise 70-95 Wt % of the total unfiled resin mass.

Filler Component: an inorganic filler for rheological tailoring based on silica, an aluminosilicate or any other stable inorganic oxide having a high surface to volume ratio and a primary particle size in the range of 20-100 nm. The filler shall comprise 1-20 Wt % of the total resin mass and may be surface modified with a range of chemical functionalities including but not limited to epoxy groups, amines, hydroxyls, alkyls and aromatics.

Catalyst Component: A catalyst system based on a thermal 'latent cure' system Specifically Ytterbium triflate or a similar rare earth Lewis acid, such as but not limited to Lanthanum(III) trifluoromethanesulfonate triflate and/or an efficient photo-acid initiator such as, but not limited to Triarylsulfonium hexafluorophosphate salts. The catalyst component shall comprise between 0.1 and 10 wt % of the total resin mass.

Chain Extender Component: a chain extender molecule/secondary crosslinking moiety based on an oligomeric polyether, polysiloxane or polyolefin bis- to multi functionalized with epoxy, hydroxyl or amine groups. The extender/crosslinker shall comprise between 0-50 Wt % of the total resin formulation mass.

Figure 5:
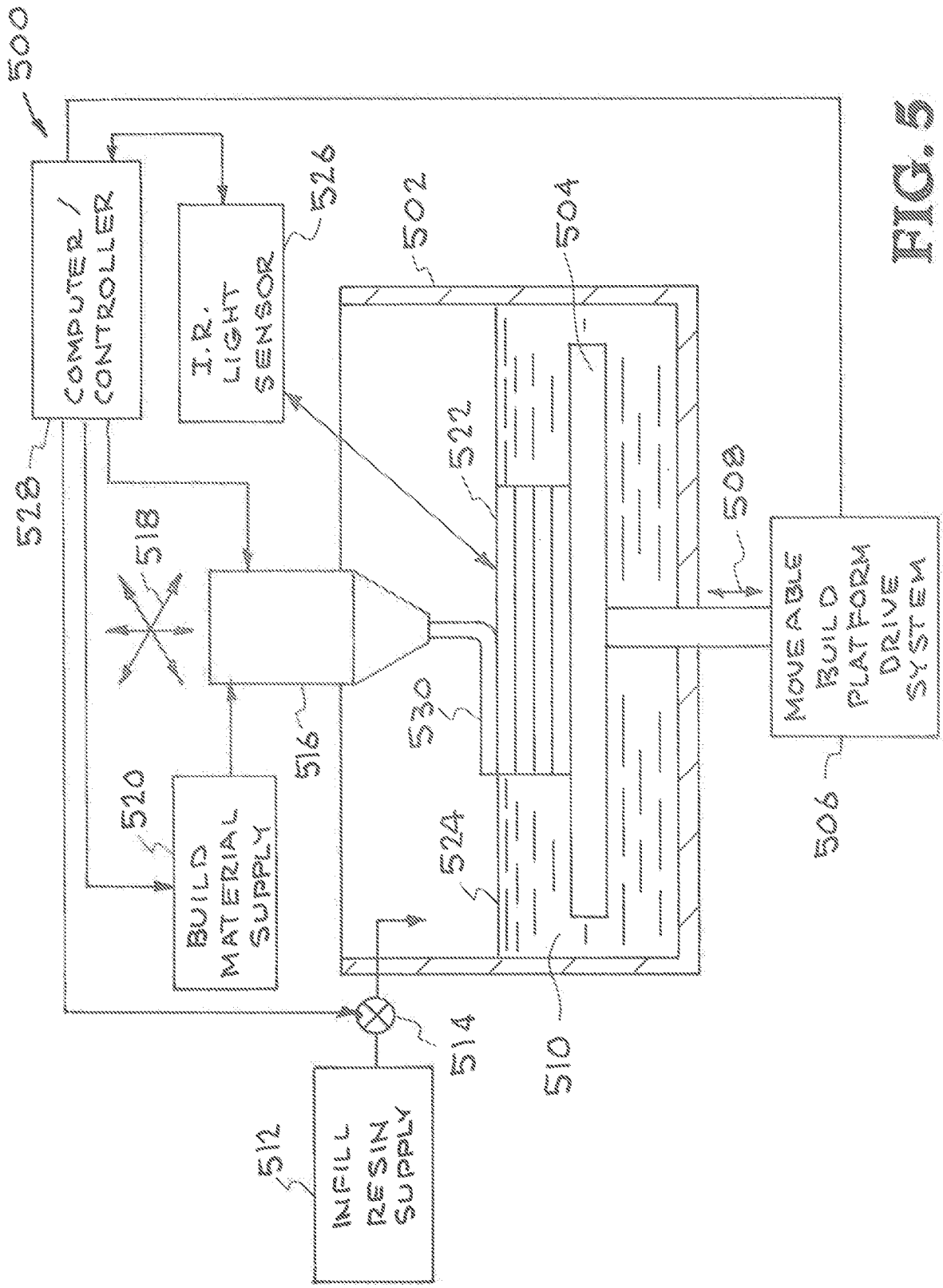
FIG. 5 illustrates yet another example of an embodiment of the inventor's apparatus, systems, and methods.

Referring now to FIG. 5, another example of an embodiment of the inventor's apparatus, systems, and methods is illustrated. This embodiment is designated generally by the reference numeral 500. As illustrated, the embodiment 500 includes a number of components. The components of the inventor's apparatus, systems, and methods 500 illustrated in FIG. 15 are identified and described below.

Reference Numeral 502—Container;
Reference Numeral 504—Build Platform;
Reference Numeral 506—Build Platform Drive System;
Reference Numeral 508—Directional Arrows;
Reference Numeral 510—Resin Bath;
Reference Numeral 512—Infill Resin Supply;
Reference Numeral 514—Control Valve;
Reference Numeral 516—Print Head;
Reference Numeral 518—Movement Arrows (Up, Down, Left & Right);
Reference Numeral 520—Build Material Supply;
Reference Numeral 522—Object Under Construction;
Reference Numeral 524—Infill Resins Bath Level;
Reference Numeral 526—IR Light Sensor;
Reference Numeral 528—Computer/Controller; and
Reference Numeral 530—Build Material Being Extruded.

The description of the inventor's embodiment 500 components illustrated in FIG. 5 having been completed, the operation and additional description of the inventor's embodiment apparatus, systems, and methods will now be considered in greater detail. In the embodiment 500 extruded material 520 is deposited on a moveable build platform by the print head 516. The embodiment 500 is further described including the interconnected components and operational steps. Various changes and modifications of the illustrated embodiment 500 will be apparent to those skilled in the art from the description of the examples and by practice of the invention. The movable build platen (1 N Z axis) contained within 502 is actuated by stepper motor/linear driver which is controlled by multi axis stage controller and may move 1 N Z axis to build a variable constant rate or in fixed steps, as determined by g-code build instructions. Liquid tight open topped bund partially enclosing build area inner walls may be physical or chemically modified to act as releasing aid for in fill resin. Thermal and/or UV source which can evenly heat or irradiate build volume enclosed. Valve controlled entrance for infill resin controlled by motion control/scale software with feedback. I.R. light sensor for detection of build level. In feedback loop with 'D', mediated by scale/motion control software. Resin infill liquid level maintained at level 'F' a previous layer Z height as determined by 'E" and G-code for build. A fluid at process temperature typically a numeric thermostat pre-polymer capable of inflating build without dissolve build resin on layer print timeframe may also be a silicon reactive fluid, wax or thermoplastic melt. In progress build of thermoset C-F filled, resin ink. By confining the build area within a bunded fluid tight bath which may be as simple as a walled dish placed on top of the build platen it is possible to print within this fluid tight 'bund' and if the structures being printed are reliant on rheological stabilization to maintain their structures prior to a curing phase, and are therefore subject to sag and collapse under their own weight/dimensions, then this innovation allows the convenient introduction of a fluid support which is metered into the bund area to a prescribed depth, trailing their build height but in advance of the sag depth. Notably the support is pumped into the bund as a liquid to allow intimate contact with the build and sets within the printing timeframe to provide sufficient support for an ongoing build beyond what is typical for a free-standing part, reliant on rheological control.

Key components of the fluid support—a material which can be pumped as a Newtonian fluid into a build area and will have good gap fill within the time frame of a single layer of DIW printing. The fluid shall solidify into a mechanically robust solid within a timeframe before the DIW build reaches its new sag height (as determined by the part and the process) The support fluid may be a hydrocarbon wax or polyolefin oligomer having a melting point above the print condition temperatures. It may also be a much higher melting phase such as a metallic allow for specialist DIW applications. The fluid support may also be a reactive elastomer or hydrogel which 'cures' chemically to form rubber like support which may be dissolved or mechanically sacrificed at a later stage. after the part has been cured. The support fluid may also be in the form of a sand/waterglass slurry or other temperature stable yet water soluble preparation as is commonly in use for the formation of sacrificial mandrel supports in current filament winding processes. Many builds will have isolated volume not accessible by the support fluid, therefore the designs of specific parts may be modified in a minor fashion to allow the influx of support material in channels or holes within the body of the part. These channels or holes may be purposely designed using computational optimization approaches to minimize stress concentrations or other weaknesses in the part.

In one example of the process a rheologically stabilized part is printed on a platen bunded by a fluid tight boundary. After 'X' layers are printed as determined by the g-coded instructions, a line of code triggers the flow of a set volume of hydrocarbon molten wax into the build volume from a heated reservoir. The wax flows around the part to a uniform height below the top of the build height and solidifies to provide intermediate support. The build continues until the next height at which another volume of wax is released and the process repeats. On completion of the build the uncured part is contained within the wax support. The part may then be cured to a gel state at a temperature below the melt temp of the support and once gelled, the cure temperature may be increased to melt and recover the support fluid before the final thermal curing stage of the finished part Co-Continuous Subtractive Milling A simple yet effective innovation which allows additional complexity in structures printed. Through the addition of one or more subtractive milling heads to the DIW system in the form of additional multi-axis heads/robot arms it is possible to additively manufacture an intermediate build, cure then subtractivley mill additional features into the build, not easily possible with a pure additive process. The process then may be continued further with additional additive steps with lay down further layers of the same or a different feedstock. Combined additive/subtractive processing of carbon fiber AM materials would allow the formation of structures not otherwise achievable such as hybrid continuous/short fiber composites with grooves, channels couplers and threads as part of the primary structure, achievable in a single process Multiple Print/Cure Heads with x-Axis Control for the Rapid Formation of Complex Builds within a Spherical Volumetric Build Space In a generational refinement it is possible to construct a multi head volumetric printing system for carbon fiber composites which embodies multiple short fiber, unfilled resin and continuous fiber additive heads, curing heads and subtractive milling heads using robotic arms in a spherical arrangement around a central 'core' platen, within a centralized 3D volume Such a generation advancement of the design is enable by preexisting robotic technology, but will allow the production of highly complex, multi-materials parts within large build volumes, rapidly and within a single process.

Extended Chemistry of "Resin Phase"

The resin phase is not limited to an epoxy resin. Rapid thermal/UV curing may also be achieved with for example with a range of urethane or acrylate thermoset chemistries.

Although the description above contains many details and specifics, these should not be construed as limiting the scope of the application but as merely providing illustrations of some of the presently preferred embodiments of the apparatus, systems, and methods. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present application fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present apparatus, systems, and methods, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

While the apparatus, systems, and methods may be susceptible to various modifications and alternative forms, specific embodiments have been shown by way of example in the drawings and have been described in detail herein. However, it should be understood that the application is not intended to be limited to the particular forms disclosed. Rather, the application is to cover all modifications, equivalents, and alternatives falling within the spirit and scope of the application as defined by the following appended claims.

The invention claimed is:

1. An additive manufacturing method for producing a product, comprising the steps of:
   providing a container;
   providing a build platform in said container;
   providing a build platform drive;
   providing an infill resin bath within said container, wherein said infill resin bath is comprised of an infill resin;
   providing a tailored resin having a resin mass, wherein said tailored resin includes an epoxy component, a filler component, a catalyst component, and a chain extender component, wherein the epoxy component is 70-95% of said resin mass, wherein the filler component is 1-20% of said resin mass, wherein the catalyst component is 0.1-10% of said resin mass, and wherein the chain extender component is 0-50% of said resin mass;
   providing an additive manufacturing print head;
   providing a build material supply connected to said additive manufacturing print head, wherein said build material supply delivers a build material comprised of said tailored resin and short carbon fibers, wherein said short carbon fibers are made of pure carbon and have a length in the range of 1 micron to 100 millimeters, wherein said additive manufacturing print head produces a fiber extruded material made of said short carbon fibers and said tailored resin;
   providing an infill resin supply containing said infill resin, wherein said infill resin supply is located outside of said container;
   providing lines and a control valve that directs said infill resin from said infill resin supply into said container to form said infill resin bath;
   using said additive manufacturing print head to deposit said fiber extruded material onto said build platform;
   providing a system with an infrared light sensor operatively connected to said control valve and operatively connected to said infill resin bath in said container, wherein said fiber extruded material is surrounded and supported by said infill resin in said infill resin bath, and wherein said infrared light sensor detects said infill resin bath and activates said control valve to direct said infill resin from said infill resin supply into said container;
   providing a computer controller; and
   using said additive manufacturing print head, said infill resin, said computer controller, and said fiber extruded material to form the product such that said infill resin bath at least partially surrounds and supports said fiber extruded material.

2. An additive manufacturing method for producing a product, comprising the steps of:
   providing a container;
   providing a build platform in said container;
   providing a build platform drive;
   providing an infill resin bath within said container, wherein said infill resin bath is comprised of an infill resin;
   providing an a tailored resin having a resin mass, wherein said tailored resin includes an epoxy component, a filler component, a catalyst component, and a chain extender component;
   wherein the epoxy component is 70-95% of said resin mass, wherein the filler component is 1-20% of said resin mass, wherein the catalyst component is 0.1-10% of said resin mass, and wherein the chain extender component is 0-50% of said resin mass;
   providing a print head, wherein said print head has axes and wherein said print head has freedom of movement along said axes;
   providing a build material supply connected to said print head, wherein said build material supply delivers a build material to said print head, wherein said build material comprises said tailored resin and at least one fiber, wherein said print head extrudes a fiber epoxy composite made of said build material;
   providing an infill resin supply, wherein said infill resin supply is located outside of said container;
   providing lines and a control valve that directs said infill resin from said infill resin supply into said container;
   using said print head to deposit said fiber epoxy composite onto said build platform creating a build level to form the product;
   providing a system with an infrared light sensor operatively connected to said control valve and operatively connected to said infill resin bath, wherein said deposited fiber epoxy composite is surrounded and supported by said infill resin in said infill resin bath, and wherein said infrared light sensor detects said build level and activates said control valve to direct said infill resin from said infill resin supply into said container;
   providing a computer controller; and
   using said print head, said infill resin, said build platform, said computer controller, and said fiber epoxy composite to form the product, wherein said infill resin at least partially surrounds and supports said fiber epoxy composite that forms the product.

\* \* \* \* \*